United States Patent
Xue et al.

(10) Patent No.: US 10,486,420 B2
(45) Date of Patent: Nov. 26, 2019

(54) DEVICE AND METHOD FOR DETECTING INK DROPLET

(71) Applicant: BOE TECHNOLOGY GROUP CO., LTD., Beijing (CN)

(72) Inventors: Jinxiang Xue, Beijing (CN); Zhongyuan Sun, Beijing (CN); Wenqi Liu, Beijing (CN); Xiang Zhou, Beijing (CN); Jingkai Ni, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/992,922

(22) Filed: May 30, 2018

(65) Prior Publication Data

US 2019/0001666 A1 Jan. 3, 2019

(30) Foreign Application Priority Data

Jul. 3, 2017 (CN) .......................... 2017 1 0533129

(51) Int. Cl.
*B41J 29/42* (2006.01)
*B41J 2/045* (2006.01)
(Continued)

(52) U.S. Cl.
CPC ....... *B41J 2/04558* (2013.01); *B41J 2/04586* (2013.01); *B41J 2/16579* (2013.01);
(Continued)

(58) Field of Classification Search
CPC .. B41J 2/04588; B41J 2/2142; B41J 2/16579; B41J 2/04586; B41J 11/0095;
(Continued)

(56) References Cited

U.S. PATENT DOCUMENTS 5,717,446 A * 2/1998 Teumer ...................... B41J 2/01
347/102
2007/0248745 A1 10/2007 Wakai et al.
(Continued)

FOREIGN PATENT DOCUMENTS

CN 101858729 A 10/2010
CN 102381028 A 3/2012
(Continued)

OTHER PUBLICATIONS

First Office Action for Chinese Patent Application No. 201710533129.2 dated Feb. 3, 2019.

*Primary Examiner* — Sharon A. Polk
(74) *Attorney, Agent, or Firm* — Calfee, Halter & Griswold LLP (57) ABSTRACT

The present disclosure relates to a device and method for detecting an ink droplet. The device includes a conveying means configured to convey an article to be printed to a printing position under a print head for ejecting the ink droplet; an imaging means configured to acquire an image of a printing area after the ink droplet is ejected on the printed area of the surface of the article by the print head; an analyzing means configured to acquire at least one geometric property of the ink droplet from the image and determine whether ink droplet abnormality has occurred based on the at least one geometric property.

16 Claims, 5 Drawing Sheets

(51) Int. Cl.
  *B41J 29/393* (2006.01)
  *B41J 3/407* (2006.01)
  *B41M 5/00* (2006.01)
  *B41J 11/00* (2006.01)
  *G06T 7/00* (2017.01)
  *G06T 7/62* (2017.01)
  *B41J 2/165* (2006.01)
  *B41J 2/21* (2006.01)

(52) U.S. Cl.
  CPC ............ *B41J 2/2142* (2013.01); *B41J 3/407* (2013.01); *B41J 11/0015* (2013.01); *B41J 11/0095* (2013.01); *B41J 29/393* (2013.01); *B41J 29/42* (2013.01); *B41M 5/0088* (2013.01); *G06T 7/001* (2013.01); *G06T 7/62* (2017.01); *B41J 2029/3935* (2013.01); *G06T 2207/20221* (2013.01); *G06T 2207/30168* (2013.01)

(58) Field of Classification Search
  CPC ...... B41J 11/0015; B41J 29/393; B41J 29/42; B41J 3/407; B41J 2029/3935; B41M 5/0088; G06T 7/62; G06T 7/001; G06T 2207/30168; G06T 2207/20221
  See application file for complete search history.

(56) References Cited

U.S. PATENT DOCUMENTS

| | | | |
|---|---|---|---|
| 2012/0105567 A1* | 5/2012 | Yoshida | B41J 11/46 347/218 |
| 2014/0002557 A1* | 1/2014 | Condello | B41J 11/002 347/102 |
| 2015/0174922 A1 | 6/2015 | Abe et al. | |
| 2015/0336381 A1* | 11/2015 | Kyoso | B41J 2/0451 347/14 |

FOREIGN PATENT DOCUMENTS

| | | |
|---|---|---|
| CN | 103481662 A | 1/2014 |
| CN | 104949626 A | 9/2015 |
| CN | 105313461 A | 2/2016 |
| JP | 2011002258 A | 1/2011 |

* cited by examiner

DEVICE AND METHOD FOR DETECTING INK DROPLET

CROSS REFERENCE

This application is based upon and claims priority to Chinese Patent Application No. 201710533129.2, filed on Jul. 3, 2017, the entire contents thereof are incorporated herein by reference.

TECHNICAL FIELD

Embodiments of the present disclosure relate to the field of inkjet printing technology, and more particularly to a device and method for detecting an ink droplet.

BACKGROUND

Inkjet printing is a manufacturing technology that uses a print head to deposit materials. It has been used in displays, sensors, semiconductors, micro-electromechanical systems, and other product areas.

SUMMARY

In one aspect of the present disclosure, there is provided a device for detecting an ink droplet. The device includes:

a conveying means configured to convey an article to be printed to a printing position under a print head for ejecting the ink droplet;

an imaging means configured to acquire an image of a printing area after the ink droplet is ejected on the printed area of the surface of the article by the print head;

an analyzing means configured to acquire at least one geometric property of the ink droplet from the image and determine whether ink droplet abnormality has occurred based on the at least one geometric property.

In an embodiment of the present disclosure, the imaging means is configured to acquire an image of a printing area by:

acquiring a plurality of intermediate images of the printing area at a predetermined time interval; and comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area.

In an embodiment of the present disclosure, the analyzing means is configured to determine whether ink droplet abnormality has occurred by:

determining a difference between the at least one geometric property of the ink droplet and a predetermined reference value, and when the difference exceeds a predetermined threshold, determining that ink droplet abnormality has occurred.

In an embodiment of the present disclosure, the at least one geometric attribute includes a size or a position of the ink droplet, wherein the size of the ink droplet includes one or more of a radius, a diameter, or an area of the ink droplet; and the position of the ink droplet includes a central position of the ink droplet or a relative position of the ink droplet with respect to an adjacent ink droplet.

In an embodiment of the present disclosure, the analyzing means is further configured to determine that ink droplet abnormality has occurred in response to at least one of the ink droplets not present in the printing area of the surface.

In an embodiment of the present disclosure, the article is a flexible film, an alignment mark is disposed on the flexible film, and the analyzing means is configured to determine whether ink droplet abnormality has occurred by comparing the image of the printing area and a reference image.

In the embodiment, the reference image i acquired by:

when the print head is normal, ejecting, by the print head, an ink droplet on a reference printing area of a reference film, wherein the reference film has the same material as that of the flexible film and has alignment marks disposed the same way as alignment marks on the flexible film and acquiring, by the imaging means, the reference image of the reference printing area.

In an embodiment of the present disclosure, comparing the image of the printing area with a reference image includes:

combining the image of the printing area with the reference image with the alignment mark of the image of the printing area aligned with the alignment mark of the reference image, to form a composite image; and analyzing the composite image to determine whether ink droplet abnormality has occurred.

In an embodiment of the present disclosure, the article is a flexible film, the delivery device includes a first rolling component, a second rolling component, a third rolling component and a fourth rolling component sequentially arranged along the conveying path, wherein the printing area of the article is defined between the second rolling component and the third rolling component.

In an embodiment of the present disclosure, the device for detecting an ink droplet further includes a positioning means that operates in operates in coordination with the conveying means so that the flexible film is conveyed at a predetermined step size.

In an embodiment of the present disclosure, the positioning means includes an optical sensor, the flexible film includes positioning marks disposed at intervals along the edge thereof, and the optical sensor is configured to detect the positioning marks so that the flexible film is conveyed at a predetermined step size.

In an embodiment of the present disclosure, the device for detecting an ink droplet further includes a curing means disposed between the third rolling component and the fourth rolling component and configured to cure the ink droplet.

In one aspect of the present disclosure, there is provided a method for detecting an ink droplet with the device for detecting an ink droplet described above or described in further detail below. The method includes:

conveying, by the conveying means, an article to be printed to the printing position under the print head;

acquiring an image of the printing area, by the imaging means, after the print head ejects the ink droplet on the printing area of the surface of the article; and acquiring, by the analyzing means, at least one geometric property of the ink droplet from the image and determining whether ink droplet abnormality has occurred based on the at least one geometric property.

In an embodiment of the present disclosure, acquiring an image of the printing area includes:

acquiring a plurality of intermediate images of the printing area at a predetermined time interval;

comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area In an embodiment of the present disclosure, the article is a flexible film, and an alignment mark is disposed on the flexible film, wherein determining whether ink droplet abnormality has occurred includes:

determining whether ink droplet abnormality has occurred by comparing the image of the printing area and a reference image, wherein the reference image is acquired by:

when the print head is normal, ejecting, by the print head, an ink droplet on a reference printing area of a reference film, wherein the reference film has the same material as that of the flexible film and has alignment marks disposed the same way as alignment marks on the flexible film and acquiring, by the imaging means, the reference image of the reference printing area.

In an embodiment of the present disclosure, comparing the image of the printing area with a reference image includes:

combining the image of the printing area with the reference image with the alignment mark of the image of the printing area aligned with the alignment mark of the reference image, to form a composite image; and analyzing the composite image to determine whether ink droplet abnormality has occurred.

BRIEF DESCRIPTION OF THE DRAWINGS

The drawings described herein are for the purpose of illustrating selected embodiments only, rather than all possible embodiments, and are not intended to limit the scope of the present application, in which.

Corresponding reference numerals indicate corresponding parts or features throughout the several views of these drawings.

DETAILED DESCRIPTION

Various embodiments will now be described in detail with reference to the accompanying drawings, which are provided as exemplary embodiments of the present disclosure to enable those skilled in the art to implement the present disclosure.

It is worth noting that the drawings and examples herein are not meant to limit the scope of the present disclosure. Where a particular element of the present disclosure can be implemented in part or in whole using known components (or methods or processes), only those parts of the known component (or method or process) necessary for understanding the present disclosure will be described. And detailed descriptions of other parts of such known components will be omitted so as not to obscure the present disclosure. Various embodiments encompass by way of illustration present and future known equivalents to those components described herein.

As used in this and the appended claims, the singular forms of the words "a," "an," also indicate plural forms, and vice versa, unless the context clearly dictates otherwise. Thus, when referring to a singular word, the plural form of the corresponding term is also included. Similarly, the words "comprise", "include," and grammatical variants thereof are to be construed as inclusive and not exclusive unless the context clearly excludes such interpretation. Where the term "example" is used herein, particularly when used after a group of terms, the term "example" merely means exemplary and illustrative and should not be considered exclusive or general. The terms "first", "second", "third", etc. are used for descriptive purposes only and are not to be construed as indicating or implying relative importance or order of formation.

Figure 1:
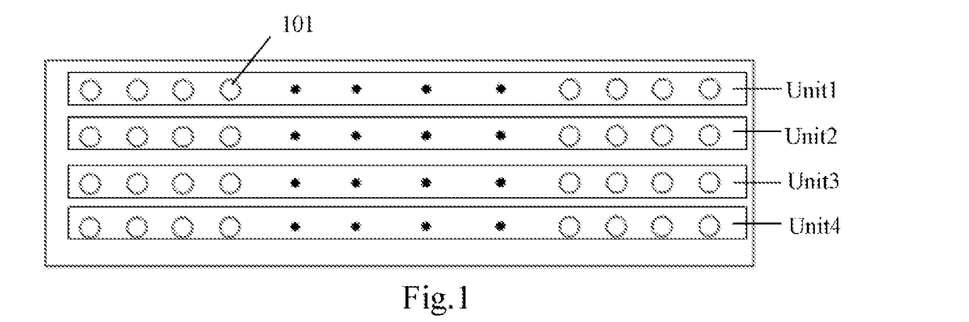
FIG. 1 is a plan view illustrating an exemplary configuration of a print head of an inkjet printing device.

In the inkjet printing process, in order to increase the printing speed, an inkjet printing device generally employs a print head having a plurality of nozzles, and even employs a plurality of print heads in cooperation. FIG. 1 is a plan view illustrating an exemplary configuration of a print head of an inkjet printing device. As shown in FIG. 1, each print head may have a plurality of nozzles 101 arranged in an array, for example. As an example, the number of nozzles can be in thousands. During operation, due to the relatively large number of nozzles, it is not possible to adjust the nozzles one by one. Usually, multiple nozzles are taken as a unit (for example, unit 1, unit 2, unit 3, unit 4) for adjusting. For example, among nozzles arranged in an array, each row is debugged as a unit. Each row can have, for example, 256 nozzles. When one or more nozzles have problems and cause the parameters of the ejected ink droplets (such as the volumes or the spray angles of the droplets) to be undesirable, or one or more nozzles get plugged and cause missing of droplets, it will affect the quality of printing. In addition, the hydrophilicity between the ink droplets and the printing surface also affects the quality of the printed ink droplets. Therefore, it is very important to quickly and effectively detect whether there is an abnormality in the ink droplets of the print head before performing the formal printing, in order to adjust the problematic nozzle timely.

A typical application of inkjet printing technology is, for example, in the packaging technology for organic light-emitting diode (OLED) display devices, and in particular for the fabrication of a flat layer in an encapsulation layer of an OLED. As described above, since the number of nozzles of the print head of the inkjet printing device is relatively large, it is not realistic to adjust each nozzle one by one. When there is an abnormality in the ink droplets ejected by one or more nozzles, the uniformity of the flat layer will be seriously affected, and the quality of the package will be affected.

In an embodiment of the present disclosure, a device and method for detecting an ink droplet are provided, which can quickly and effectively detect ink droplet abnormalities, thereby the nozzle from which the abnormal ink droplet comes can be specifically adjusted. It can improve the adjusting efficiency and improve printing quality.

In the context of the present disclosure, optionally, embodiments in which the print head has a plurality of nozzles or a plurality of ink droplets can be simultaneously ejected are described in detail. However, it will be appreciated that embodiments in which the print head has only one nozzle or only one ink droplet is sprayed at a time are also applicable to the present disclosure.

Figure 2:
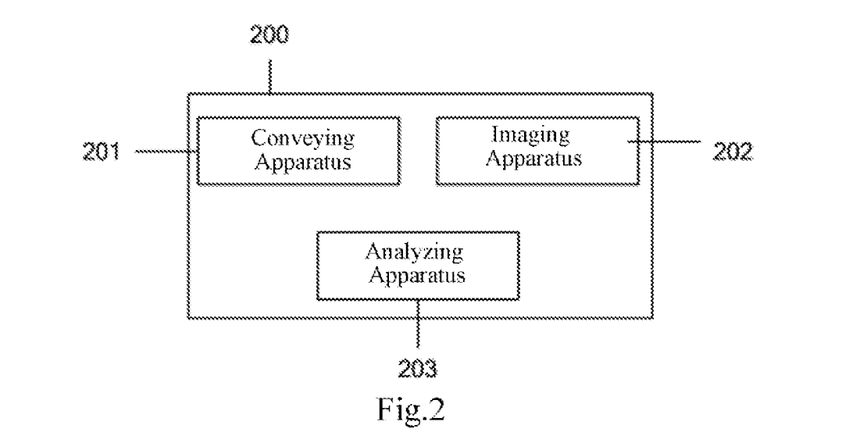
FIG. 2 is a block diagram illustrating a device for detecting an ink droplet according to an embodiment of the present disclosure.

In one aspect of the present disclosure, a device for detecting an ink droplet is provided. FIG. 2 is a block diagram illustrating a device for detecting an ink droplet according to an embodiment of the present disclosure. As shown in FIG. 2, the device 200 may include a conveying means 201, an imaging means 202, and an analyzing means 203. In the embodiment shown in FIG. 2, the conveying means 201 may be configured to convey an article to be printed to a printing position under a print head for ejecting an ink droplet. The imaging means 202 may be configured to acquire an image of a printing area after the ink droplet is ejected on the printed area of the surface of the article by the print head. The analyzing means 203 may be configured to acquire at least one geometric property of the ink droplet from the image of the printed area and determine whether ink droplet abnormality has occurred based on the at least one geometric property.

In one or more or all of the embodiments of the present disclosure, the analyzing means 203 may be implemented by hardware. As an example, the analyzing means 203 may be a personal computer (PC) or a microcomputer or the like having a processor and a memory which is configured and/or programmed to achieve a corresponding function, or may be other hardware structure integrated or connected to a personal computer (PC) or a microcomputer having a processor and a memory, and configured and/or programmed to achieve a corresponding function. Additionally or alternatively, the analyzing means 203 may also be implemented by software or firmware modules stored in a personal computer (PC) or a microcomputer having a processor and a memory.

In the embodiment shown in FIG. 2, through the coordinated operation of the conveying means 201, the imaging means 202, and the analyzing means 203, it is possible to quickly and efficiently determine whether or not ink droplet abnormality has occurred. Then, when it is detected ink droplet abnormality, it is possible to adjust specifically to the nozzle from which the abnormal ink droplet comes. It can improve the printing quality of the product to be printed.

In an embodiment of the present disclosure, the article to be printed may be a flexible film, for example, a transparent flexible film. However, the embodiment of the present disclosure may be applicable to other forms of articles. For example, the article to be printed may be rigid.

In addition, as already mentioned above, the inkjet printing technology can be applied in a packaging process of a flexible OLED, for example for forming an encapsulation layer. The encapsulating layer may have a sandwich structure, in which the intermediate layer is a flat layer formed by inkjet printing technology, and the surface layers on both sides of the intermediate layer are inorganic layers formed by chemical vapor deposition technique. According to an embodiment of the present disclosure, the material of the surface of the article to be printed may be the same inorganic material as the aforementioned surface layer. For example, the article to be printed may be a transparent flexible film having a surface layer formed of inorganic material such as SiN, SiNO.

In an embodiment of the present disclosure, the imaging means 202 may acquire an image of a printing area by acquiring a plurality of intermediate images of the printing area at a predetermined time interval; comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area.

According to an embodiment of the present disclosure, the predetermined time interval may be 30 seconds to 45 seconds.

In this manner, the imaging means 202 may acquire an image of the printing area after the ink droplet is completely diffused on the surface of the article to be printed. That is, the imaging means 202 may acquire an image of ink droplet in a stable state, which can improve the accuracy of detection. Although according to an embodiment of the present disclosure, it is also possible to acquire a state of the ink droplet at any time before the ink droplet enters a stable state.

According to an embodiment of the present disclosure, the imaging means may be a scanning camera that can scan a printing area at a predetermined time interval after the print head performs ink ejection to acquire an image of the printing area.

According to an embodiment of the present disclosure, in one inspection process, each nozzle of the print head can eject only one drop of ink droplet on the article to be printed, and the ink droplet is diffused on the surface of the article. In this embodiment, the imaging means 202 (e.g., a scanning camera) scans the printing area at a predetermined time interval, acquires the radius and the center position of the ink droplet through edge recognition, compares the radius of the ink droplet acquired each time with the data acquired for the previous time, and when the radius of the ink droplet stops changing, stops scanning and takes the image scanned for the last time as the image of the printing area. Alternatively, the image scanned for the second last time as the image of the printing area.

In an embodiment of the present disclosure, the analyzing means 203 may be configured to determine whether ink droplet abnormality has occurred by determining a difference between at least one geometric property of the ink droplet and a reference value, and when the difference exceeds a predetermined threshold, it is determined that ink droplet abnormality has occurred.

In embodiments of the present disclosure, at least one geometric property of the ink droplet may include a size or a position of the ink droplet. The size of the ink droplet may include one or more of a radius, a diameter, or an area of the ink droplet; and the position of the ink droplet may include a central position of the ink droplet or a relative position of the ink droplet with respect to an adjacent ink droplet.

In an exemplary embodiment, one or more of a radius, a diameter, an area, a center position, or a relative position of an ink droplet may be compared with a corresponding reference value, and when the difference between the geometric property of the ink droplet and the reference value is greater than a predetermined threshold value, it is determined that ink droplet abnormality has occurred.

Figure 3:
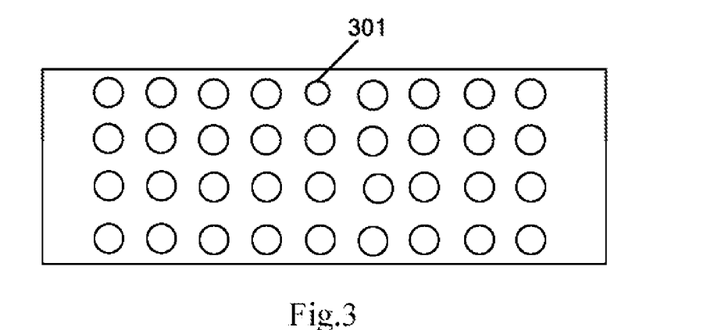
FIG. 3 schematically shows the case where ink droplet abnormality of small size occurs in the image of the printing area.
Figure 4:
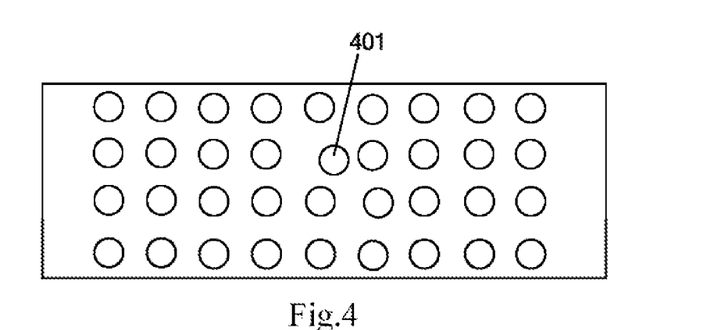
FIG. 4 schematically shows the case where ink droplet abnormality of position offset occurs in the image of the printing area.

Ink droplet abnormality may include, for example, droplet size abnormality (including large or small droplets), or ink droplet position offset. FIG. 3 schematically shows the case where ink droplet abnormality of small size occurs in the image of the printing area. FIG. 4 schematically shows the case where ink droplet abnormality of position offset occurs in the image of the printing area. In FIG. 3, the size of the ink droplet 301 located in the middle of the first row is smaller than the sizes of other ink droplets, which indicates that the size of the ink droplet 301 is abnormal. In FIG. 4, the size of the ink droplet 401 located in the second row is deviated from the predetermined position, which indicates that the position of the ink droplet 401 is abnormal. Therefore, it is possible to adjust the nozzle corresponding to the abnormal ink droplet.

Alternatively, ink droplet abnormality may also include missing droplet. In this case, the analyzing means 203 may be further configured to determine that ink droplet abnormality has occurred in response to at least one of the ink droplets not present in the printing area of the article to be printed. In other words, when the analyzing means 203 detects that at least one of the ink droplets is missing in the image of the article to be printed, the analyzing means 203 determines that ink droplet abnormality has occurred.

Figure 5:
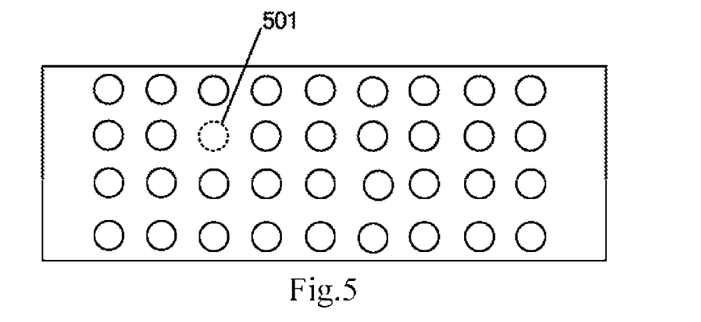
FIG. 5 schematically shows the case where ink droplet abnormality of missing droplet occurs in the image of the printing area.

FIG. 5 schematically shows the case where ink droplet abnormality of missing droplet occurs in the image of the printing area. In FIG. 5, a missing ink droplet 501 is shown by a dashed line. When missing droplet abnormality is detected, the nozzle corresponding to the missing droplet may be cleaned.

As already mentioned above, the article to be printed may be a flexible film. In one or more embodiments of the present disclosure, the analyzing means 203 may also be configured to determine whether ink droplet abnormality has occurred by comparing the image of the printing area with a reference image. In this embodiment, the reference image may be acquired by: when the print head is normal, ejecting, by the print head, an ink droplet on a reference printing area of a reference film (i.e., one example of an article to be printed as a reference sample) having the same material as that of the flexible film; and acquiring a reference image of the reference printing area through the imaging means 202.

Figure 6:
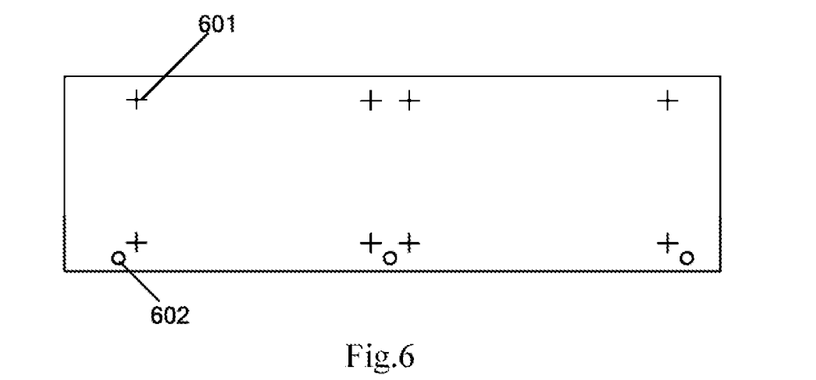
FIG. 6 schematically shows a diagram of a flexible film according to an embodiment of the present disclosure.

FIG. 6 schematically shows a diagram of a flexible film according to an embodiment of the present disclosure. To facilitate comparison of the image of the printing area with the reference image, as shown in FIG. 6, an alignment mark 601 may be provided on the flexible film, and the reference film may have the same alignment mark as the alignment mark 601 of the flexible film. In the example shown in FIG. 6, four corners of each printing area are provided with alignment marks 601 in order to strictly align the printing area of the flexible film with the printing area of the reference film. It should be understood that embodiments of the present disclosure have no limitation on the shape and position of the alignment mark, and those skilled in the art can appropriately select the shape and position of the alignment mark according to actual needs.

In this embodiment, the analyzing means 203 may combine the image of the printing area with the reference image to align the alignment mark of the image of the printing area with the alignment mark of the reference image to form a composite image, analyze the composite image, and determine whether ink droplet abnormality has occurred.

As an example, the composite image may be analyzed based on at least one property of the ink droplet to determine whether ink droplet abnormality has occurred.

Figure 7:
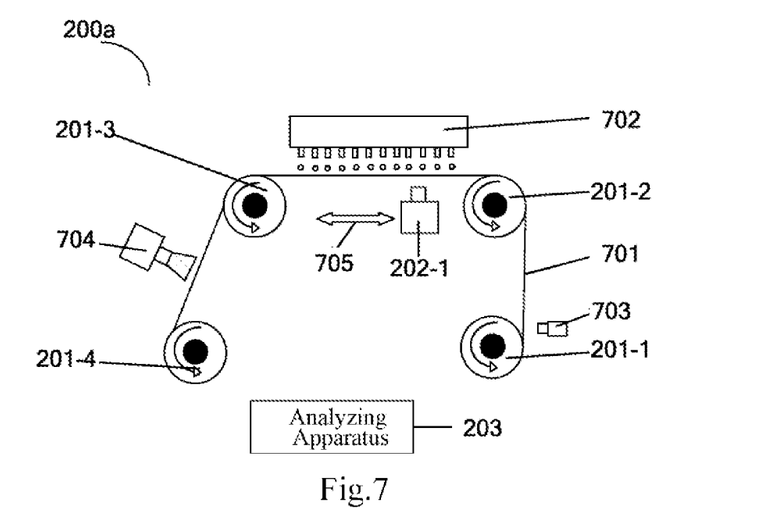
FIG. 7 schematically shows a structural configuration diagram of a device for detecting an ink droplet according to an embodiment of the present disclosure.

FIG. 7 schematically shows a structural configuration diagram of a device for detecting an ink droplet according to an embodiment of the present disclosure. As shown in FIG. 7, a device 200a for detecting an ink droplet includes a conveying means 201 and a scanning camera 202-1 as an imaging means. The conveying means 201 may include a first rolling component 201-1, a second rolling component 201-2, a third rolling component 201-3, and a fourth rolling component 201-4 arranged along the conveying path. In this embodiment, the printing area of the article to be printed is defined between the second rolling component 201-2 and the third rolling component 201-3.

In the embodiment shown in FIG. 7, the article to be printed may be a transparent flexible film 701, and the first to fourth rolling components may be rollers. The scanning camera 202-1 and the print head 702 may be located respectively on the two sides of the printing area of transparent flexible film 701. The print head 702 ejects ink droplets to the surface of the transparent flexible film 701 through nozzles. The scanning camera 202-1 scans the printing area along the scanning direction 705 to acquire the image of the printing area after the ink droplet is completely diffused. A portion of the transparent flexible film 701 not printed with an ink droplet may be wound on the first rolling component 201-1. A portion of the transparent flexible film 701 on which the ink droplet has been printed may be wound on the fourth rolling component 201-4. The second rolling component 201-2 and the third rolling component 201-3 are configured to support the transparent flexible film 701 and define the printing area of the transparent flexible film 701.

When the print head ejects one or more ink droplets and the scanning camera 202-1 acquires, for example, an image of the ink droplets in a steady state by scanning the printing area. At least the first scroll device 201-1 and the fourth scroll device 201-4 are rolled, such that the fourth rolling component 201-4 is wound by the portion of the transparent flexible film 701 that has been printed. The first rolling component 201-1 releases the portion of the transparent flexible film 701 that has not been printed, so as to move the printed portion of the transparent flexible film 701 out of the printing area and replace it with the unprinted portion of the transparent flexible film 701 at the printing position of the print head.

In one or more embodiments, as shown in FIG. 7, the device 200a for detecting an ink droplet may further include a positioning means 703 that operates in coordination with the conveying means 201 so that the transparent flexible film 701 is conveyed at a predetermined step size.

In an exemplary embodiment, the positioning means 703 may be disposed between the first rolling component 201-1 and the second rolling component 201-2, although other settings are also possible according to actual needs.

In an exemplary embodiment, the positioning means 703 may include an optical sensor, such as a laser sensor.

In an embodiment of the present disclosure, as shown in FIG. 6, a flexible film (e.g., a transparent flexible film) may include positioning marks 602 disposed at intervals along its edges. A positioning means 703 (e.g., a laser sensor) may be configured to detect the positioning mark 602 so that the flexible film is conveyed at a predetermined step size. As an example, the positioning mark 602 may be a through hole provided on the flexible film, and an interval between adjacent positioning marks may be equal to a distance between the second rolling component 201-2 and the third rolling component 201-3. Correspondingly, the predetermined step may be equal to the interval between adjacent positioning marks. It should be understood that there is no particular limitation to the location and form of the positioning mark 602 in the embodiment of the present disclosure, and those skilled in the art could appropriately select according to actual needs.

According to an embodiment of the present disclosure, the positioning means 703 (e.g., a laser sensor) may detect the positioning mark 602 during the first transparent rolling component 201-1 and the fourth rolling component 201-4 conveying the transparent flexible film 701 by rotation. When the positioning means 703 detects the positioning mark 602, it means that the portion of the transparent flexible film that has been printed has been moved out of the printing area, so that the first rolling component 201-1 and the fourth rolling component 201-4 can stop rotating.

In one or more embodiments, as shown in FIG. 7, the device 200a for detecting an ink droplet may further include a curing means 704 for curing ink droplets. The curing means 704 may be disposed between the third rolling component 201-3 and the fourth rolling component 201-4. It would be understood that other suitable configurations of the curing means are also feasible.

In an exemplary embodiment, the curing means 704 may be an ultraviolet curing means.

In another aspect of the present disclosure, a method for detecting an ink droplet is disclosed. Optionally, the method may utilize a device for detecting an ink droplet according to the present disclosure, such as a device for detecting an ink droplet according to one or more embodiments disclosed above and/or below in more detail. Therefore, for alternative embodiments of the method, reference may be made to the embodiment of the device for detecting an ink droplet. The method includes the steps that will be described in detail below, which may be performed in a given order or in a different order. In addition, additional method steps not listed may be provided, or the listed method steps may be deleted or modified. In addition, two or more or even all method steps may be performed at least partially simultaneously. In addition, the method steps can be performed twice or even more than twice.

Figure 8:
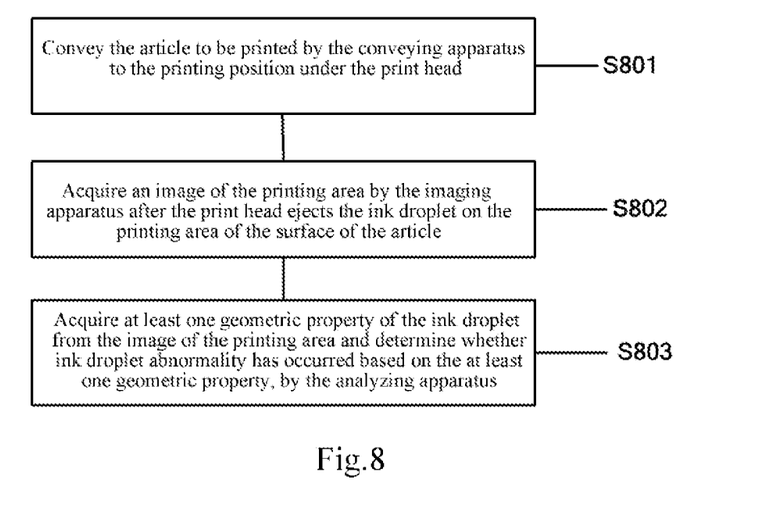
FIG. 8 schematically shows a flowchart of a method for detecting an ink droplet according to an embodiment of the present disclosure.

FIG. 8 schematically shows a flowchart of a method for detecting an ink droplet according to an embodiment of the present disclosure. The method includes steps S801-S803.

In step S801, the article to be printed is conveyed by the conveying means to the printing position under the print head.

In step S802, an image of the printing area is acquired by the imaging means after the print head ejects the ink droplet on the printing area of the surface of the article.

In this step, the imaging means may specifically acquire an image of the printing area by: acquiring a plurality of intermediate images of the printing area at a predetermined time interval; comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area.

In step S803, at least one geometric property of the ink droplet is acquired from the image of the printing area and it is determined whether ink droplet abnormality has occurred based on the at least one geometric property, by the analyzing means.

In an embodiment of the present disclosure, the article to be printed may be a flexible film on which an alignment mark is disposed.

In step S803, whether or not ink droplet abnormality has occurred may be determined by comparing the image of the printing area with a reference image.

In this embodiment, the reference image may be acquired by: when the print head is normal, ejecting an ink droplet on a reference printing area of a reference film by the print head; and acquiring a reference image of the reference printing area through the imaging means. The reference film has the same material as that of the flexible film and has alignment marks disposed the same way as the alignment marks of the flexible film.

In this embodiment, the image of the printing area may be compared with the reference image by: combining the image of the printing area with the reference image with the alignment mark of the image of the printing area aligned with the alignment mark of the reference image to form a composite image, analyzing the composite image, and determining whether ink droplet abnormality has occurred. As an example, the composite image may be analyzed based on at least one property of the ink droplet corresponding to the image of the printing area and at least one property of the ink droplet corresponding to the reference image, to determine whether ink droplet abnormality has occurred.

Figure 9:
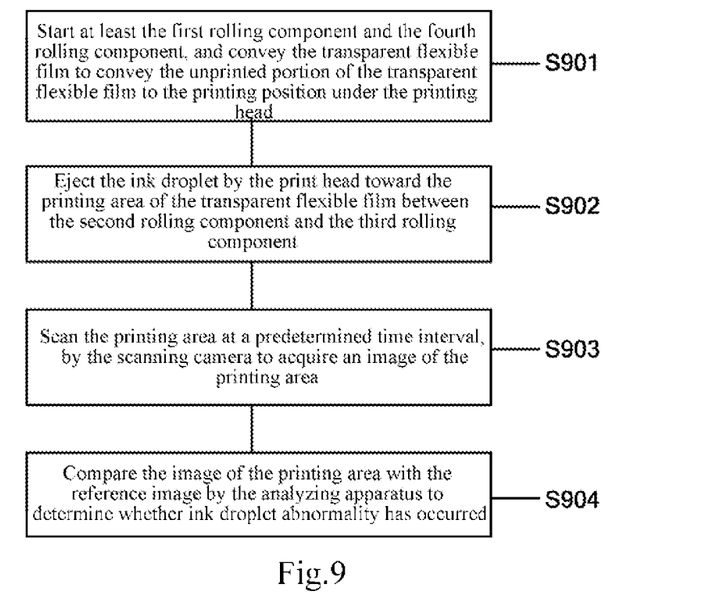
FIG. 9 schematically shows a flowchart of a method for detecting an ink droplet with the device shown in FIG. 7.

Hereinafter, an exemplary method for detecting whether ink droplet abnormality has occurred with the device for detecting an ink droplet shown in FIG. 7 will be described in detail with reference to FIG. 9. FIG. 9 schematically shows a flowchart of a method for detecting an ink droplet with the device shown in FIG. 7.

In the embodiment shown in FIG. 9, the article to be printed may be a transparent flexible film 701, and an alignment mark (for example, the symbol "+" in FIG. 6) and a positioning mark (for example, a through hole shown in FIG. 6) are provided on the transparent flexible film. The imaging means 202 may be a scanning camera 202-1; and the positioning means 703 may be a laser sensor. As shown in FIG. 9, the method for detecting an ink droplet includes steps S901-S904.

In step S901, at least the first rolling component 201-1 and the fourth rolling component 201-4 are started, and the transparent flexible film 701 is conveyed to convey the unprinted portion of the transparent flexible film to the printing position under the printing head 702.

In this step, after the first rolling component 201-1 and the fourth rolling component 201-4 are started, the printed portion of the transparent flexible film 701 is moved out of the printing position under the printing head 702. In addition, the ink droplets at the printing position can be cured by the curing means 704 so as to prevent the ink droplets from falling off from the transparent flexible film 701.

At the same time as or after starting the first rolling component 201-1 and the fourth rolling component 201-4, the positioning mark may be detected with the laser sensor, and when the laser sensor detects the positioning mark, the first rolling component 201-1 and the four rolling components 201-4 stop rotating.

In this embodiment, the first rolling component 201-1 and the fourth rolling component 201-4 may be stopped at the same time, or the fourth rolling component 201-4 may be stopped after the first rolling component 201-1 is stopped, so as to prevent the transparent flexible film 701 is relaxed.

In step S902, an ink droplet is ejected by the print head 702 toward the printing area of the transparent flexible film 701 between the second rolling component 201-2 and the third rolling component 201-3.

During this step, each nozzle of the print head 702 may eject one or more drops of ink. After an ink droplet is ejected onto the printing area, the ink droplet is diffused on the surface of the printing area.

In step S903, the printing area is scanned at a predetermined time interval (for example, 30 seconds or 45 seconds) by the scanning camera to acquire an image of the printing area.

During this step, the image acquired by the scanning camera after the ink droplet is completely diffused on the surface of the printing area may be taken as the image of the printing area.

In step S904, the image of the printing area is compared with the reference image by the analyzing means to determine whether ink droplet abnormality has occurred, where the reference image is an image of the printing area of the reference film acquired when the print head is in a normal condition.

In this step, the image of the printing area and the reference image may be aligned with the aid of the alignment marks to form a combined image. Then the combined image is analyzed to determine whether ink droplet abnormality has occurred. As an example, the ink droplet abnormality may be determined by one or more of the following ways:

i) comparing the radius R of the ink droplet in the image of the printing area with the radius $R_n$ of the corresponding ink droplet in the reference image, and when $|R-R_n|>R_0$, determining that the ink droplet has volume abnormality, where $R_0$ is a constant, which may be a value selected based on actual needs;

ii) comparing the coordinates (a,b) of the ink droplet in the image of the printing area with respect to a particular coordinate system (e.g. the Cartesian coordinate system) and the coordinates $(a_n, b_n)$ of the corresponding ink droplet in the reference image with respect to that particular coordinate system, and when $|a-a_n|>a_0$, and/or $|b-b_n|>b_0$, determining that the ink droplet has positional deviation abnormality, where each of $a_0$ and $b_0$ is a constant, which may be a value selected based on actual needs;

iii) when an ink droplet corresponding to one or more ink droplets in the reference image does not exist in the image of the printing area, determining that ink droplet abnormality has occurred.

After the detection is completed, the defective nozzle may be adjusted based on the detection result so that inkjet print can be performed normally on the article. After inkjet printing device has been put into operation for a while after the adjusting, if necessary, the first and fourth rolling components may be started again, and the transparent flexible film may be conveyed to convey an unprinted portion of the transparent flexible film to the printing position under the print head, so as to detect ink droplet abnormality for another time.

The foregoing description of the embodiments has been provided for purposes of illustration and description. It is not intended to be exhaustive or to limit the application. The various elements or features of a particular embodiment are generally not limited to a particular embodiment, but, where appropriate, these elements and features are interchangeable and can be used in selected embodiments, even if not specifically shown or described. It can also be modified in many ways. Such modification cannot be considered as deviating from the present application, and all such modifications are included in the scope of the present application.

What is claimed is:

1. A device for detecting an ink droplet, comprising:
a conveying means, configured to convey an article to be printed to a printing position under a print head for ejecting the ink droplet;
an imaging means, configured to acquire an image of a printing area after the ink droplet is ejected on the printed area of the surface of the article by the print head;
an analyzing means, configured to acquire at least one geometric property of the ink droplet from the image and determine whether ink droplet abnormality has occurred based on the at least one geometric property;
wherein the imaging means is configured to acquire an image of a printing area by:
acquiring a plurality of intermediate images of the printing area at a predetermined time interval; and
comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area.

2. The device according to claim 1, wherein the analyzing means is configured to determine whether ink droplet abnormality has occurred by:
determining a difference between the at least one geometric property of the ink droplet and a predetermined reference value, and when the difference exceeds a predetermined threshold, determining that ink droplet abnormality has occurred.

3. The device according to claim 2, wherein the at least one geometric attribute comprises a size or a position of the ink droplet, wherein the size of the ink droplet comprises one or more of a radius, a diameter, or an area of the ink droplet; and the position of the ink droplet comprises a central position of the ink droplet or a relative position of the ink droplet with respect to an adjacent ink droplet.

4. The device according to claim 3, wherein the article is a flexible film, an alignment mark is disposed on the flexible film, and the analyzing means is configured to determine whether ink droplet abnormality has occurred by comparing the image of the printing area and a reference image, wherein the reference image is acquired by:
an ink droplet is ejected on a reference printing area of a reference film by the print head, wherein the print head is in a normal condition, and wherein the reference film is made of the same material as that of the flexible film, and alignment marks are disposed on the reference film in a same way as alignment marks being disposed on the flexible film; and
acquiring, by the imaging means, the reference image of the reference printing area.

5. The device according to claim 2, wherein the article is a flexible film, an alignment mark is disposed on the flexible film, and the analyzing means is configured to determine whether ink droplet abnormality has occurred by comparing the image of the printing area and a reference image, wherein the reference image is acquired by:
an ink droplet is ejected on a reference printing area of a reference film by the print head, wherein the print head is in a normal condition, and wherein the reference film is made of the same material as that of the flexible film, and alignment marks are disposed on the reference film in a same way as alignment marks being disposed on the flexible film; and acquiring, by the imaging means, the reference image of the reference printing area.

6. The device according to claim 1, wherein the analyzing means is further configured to determine that ink droplet abnormality has occurred in response to at least one of the ink droplets not present in the printing area of the surface.

7. The device according to claim 6, wherein the article is a flexible film, an alignment mark is disposed on the flexible film, and the analyzing means is configured to determine whether ink droplet abnormality has occurred by comparing the image of the printing area and a reference image, wherein the reference image is acquired by:

an ink droplet is ejected on a reference printing area of a reference film by the print head, wherein the print head is in a normal condition, and wherein the reference film is made of the same material as that of the flexible film, and alignment marks are disposed on the reference film in a same way as alignment marks being disposed on the flexible film; and acquiring, by the imaging means, the reference image of the reference printing area.

8. The device according to claim 1, wherein the article is a flexible film, an alignment mark is disposed on the flexible film, and the analyzing means is configured to determine whether ink droplet abnormality has occurred by comparing the image of the printing area and a reference image, wherein the reference image is acquired by:

an ink droplet is ejected on a reference printing area of a reference film by the print head, wherein the print head is in a normal condition, and wherein the reference film is made of the same material as that of the flexible film, and alignment marks are disposed on the reference film in a same way as alignment marks being disposed on the flexible film; and acquiring, by the imaging means, the reference image of the reference printing area.

9. The device according to claim 8, wherein the step of comparing the image of the printing area with a reference image comprises:

combining the image of the printing area with the reference image with the alignment mark of the image of the printing area aligned with the alignment mark of the reference image, to form a composite image; and analyzing the composite image to determine whether ink droplet abnormality has occurred.

10. The device according to claim 1, wherein the article is a flexible film, the conveying means comprises a first rolling component, a second rolling component, a third rolling component and a fourth rolling component sequentially arranged along a conveying path, wherein the printing area of the article is defined between the second rolling component and the third rolling component.

11. The device according to claim 10, further comprising a positioning means, wherein the positioning means operates in coordination with the conveying means so that the flexible film is conveyed at a predetermined step size.

12. The device according to claim 11, wherein the positioning means comprises an optical sensor, the flexible film comprises positioning marks disposed at intervals along the edge thereof, and the optical sensor is configured to detect the positioning marks so that the flexible film is conveyed at a predetermined step size.

13. The device according to claim 10, further comprising a curing means disposed between the third rolling component and the fourth rolling component and configured to cure the ink droplet.

14. A method for detecting an ink droplet with the device according to claim 1, comprising:

conveying, by the conveying means, an article to be printed to the printing position under the print head;

acquiring an image of the printing area, by the imaging means, after the print head ejects the ink droplet on the printing area of the surface of the article; and acquiring, by the analyzing means, at least one geometric property of the ink droplet from the image and determining whether ink droplet abnormality has occurred based on the at least one geometric property;

wherein the step of acquiring an image of the printing area comprises:

acquiring a plurality of intermediate images of the printing area at a predetermined time interval;

comparing an intermediate image acquired for a next time and an intermediate image acquired for a previous time; and when the intermediate image acquired for a next time has the same size with the intermediate image acquired for a previous time, setting the intermediate image acquired for a next time or the intermediate image acquired for a previous time as the image of the printing area.

15. The method according to claim 14, wherein the article is a flexible film, and an alignment mark is disposed on the flexible film, wherein the step of determining whether ink droplet abnormality has occurred comprises:

determining whether ink droplet abnormality has occurred by comparing the image of the printing area and a reference image, wherein the reference image is acquired by:

an ink droplet is ejected on a reference printing area of a reference film by the print head, wherein the print head is in a normal condition, and wherein the reference film is made of the same material as that of the flexible film, and alignment marks are disposed on the reference film in a same way as alignment marks being disposed on the flexible film; and acquiring, by the imaging means, the reference image of the reference printing area.

16. The method according to claim 15, wherein the step of comparing the image of the printing area with a reference image comprises:

combining the image of the printing area with the reference image with the alignment mark of the image of the printing area aligned with the alignment mark of the reference image, to form a composite image; and analyzing the composite image to determine whether ink droplet abnormality has occurred.

* * * * *